June 25, 1968  R. GOTTSCHALD  3,389,926

BALL JOINTS, ESPECIALLY IN THE FORM OF ANGULAR JOINTS

Filed Nov. 16, 1965

Inventor
RUDOLF GOTTSCHALD
BY
Kenyon & Kenyon
ATTORNEYS ates Patent Office 3,389,926
Patented June 25, 1968

3,389,926
BALL JOINTS, ESPECIALLY IN THE FORM
OF ANGULAR JOINTS
Rudolf Gottschald, Osterath, Germany, assignor to
Messrs. A. Ehrenreich & Cie.
Filed Nov. 16, 1965, Ser. No. 508,082
Claims priority, application Germany, Sept. 23, 1965,
E 22,252
2 Claims. (Cl. 287—87)

ABSTRACT OF THE DISCLOSURE

The invention relates to a ball and socket joint comprised of a resilient bushing and a hinge pin terminating in a ball head. The resilient bushing has a bellows seal integrally formed therewith which is designed to engage the shaft of the hinge pin in sealing relationship. The resilient bushing member has formed therein, an outer annular peripheral recess and a spherical cavity adapted to accommodate the ball head of the pin member. The vertical dimension of the outer annular recess is smaller than the diameter of the ball and is located in the plane through which the horizontal center line of the ball head passes. The joint is assembled by first inserting the external bushing member in an annular cooperating socket that fits within the outer annular recess and subsequently inserting the ball head of the pin through the seal and into the spherical cavity.

---

The invention relates to a ball and socket joint, in the form of an angular joint or small size joint. Basically, the ball and socket joint has its primary application in the linkage of the steering gear of motor vehicle. In particular, the ball and socket joint is remarkable for its especially simple construction enabling easy assembly thereof. However, despite such simple construction, it is provided with means to protect against accumulation of dirt in the interior of the assembly.

The present state of the art in the field of pivotal or angular socket joints consists generally of two piece bushing members having an outer external member required to retain the assembly in the proper relationship or a single outer bushing member having the ball member retained therein by an internal washer or an outer metal case or housing.

Accordingly, it is the object of this invention to provide a simply constructed ball and socket joint which can easily be assembled and disassembled.

A further object of the invention is to provide a ball and socket joint which can be inserted into an annular ring and which, when inserted therein, facilitates the insertion into the socket bushing of the hinge pin ball head.

It is also an object of the invention to provide the external elastic bushing member of the ball and socket joint with an integrally formed bellows seal to function as a dust cover.

It is an additional object of the present invention to design the ball joint to cooperate with a mating ring which surrounds the external bushing member at a point which passes through the plane of the horizontal center line of the hinge pin ball head.

To achieve these and other advantages, the ball and socket joint is comprised of a resilient bushing, a hinge pin and an annular socket which serves to attach the joint to the cooperating rod in the gear linkage. The resilient bushing is provided with an integrally formed bellows seal extending from the outer periphery thereof and terminating in an opening designed to engage the hinge pin shaft in sealing relationship. In addition, a spherical cavity is formed in the interior of the resilient bushing to accommodate the hnge pin ball head while an outer peripheral recess is provided to facilitate attachment of the bushing to the annular socket of a cooperating rod end. It is critical to the design that the outer peripheral recess have a vertical dimension smaller than the diameter of the hinge pin ball diameter. Similarly, the annular socket must have the same vertical dimension.

The said joint is remarkable for its great simplicity and easy assembly despite the bellows seal which is provided as a dust cover. To assemble the ball and socket joint, the resilient bushing is snapped into the annular socket and subsequently the hinge pin ball head is inserted in the resilient bushing. Due to the fact that the resilient bushing and the bellows seal are integrally formed, there will not be any seam between the case and the bellows seal thereby affording the advantages of simplified construction, and improved sealing.

The annular socket may consist of a divided tube piece to which a stud has been welded as a connecting element to a link in the gear assembly.

A variation of the joint will even be possible in that the annular socket may take the form of a split ring.

The invention will be described further, by way of example, with reference to the accompanying drawings wherein.

Figure 1:
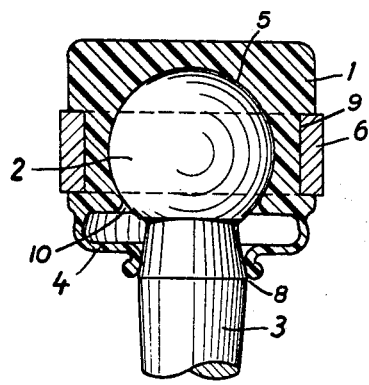
FIG. 1 is an elevation and vertical section of the joint assembly.
Figure 2:
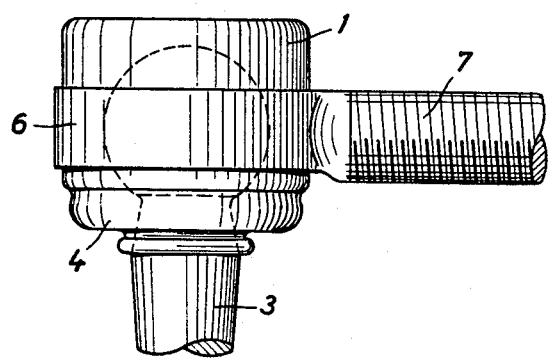
FIG. 2 is an elevational view of the joint.

The ball and socket joint is comprised of an external bushing member 1, a joint pin 3 terminating in a ball head 2 and an annular socket 6, all of which as seen in FIG. 1.

Basically, the external bushing member 1 is formed of a resilient material, preferably polyurethane. In addition, the resilient bushing 1 has a spherical cavity 5 formed therein which is adapted to receive the ball head 2 of the hinge pin 3. The surface of the spherical cavity 5 constitutes the bearing surface for the ball head 2 since it is in intimate contact with the entire surface thereof except for the opening through which the hinge pin 5 passes.

In proximity to the opening 10 through which hinge pin 3 passes, the external bearing member 1 has an integrally formed bellows seal 4 extending from the outer periphery of the lower surface of the resilient bushing 1. The bellows seal 4 is also structured to include a terminal opening 8 that is adapted to engage the shaft of the hinge pin 3 in sealing relationship.

The resilient bushing 1 has formed on its outer periphery a recess 9 into which the annular socket 6 fits to connect the ball and socket joint to the appropriate steering gear linkage 7. The recess 9 is located in the plane of the horizontal center line of the hinge pin ball head 2 and its vertical dimension is substantially less than the diameter of the ball head 2.

The dimension of the recess 9 and mating annular socket 6 are critical since they afford a design wherein the rigid metal annular socket 6 does not extend downwardly to the horizontal plane through which the opening 10 passes. Consequently, the annular socket 6 will not impede the deflection of the resilient material around the opening 10. This design is directed to facilitating the simplified assembly of the parts; i.e., the resilient bushing 1 can first be snapped into the socket 6 and subsequently the ball head 2 can be inserted into the cavity 5 in the bushing 1 by forcing the resilient bushing material around the opening 10 outwardly.

I claim:

1. In a ball and socket joint having a hinge pin terminating in a ball head, an elastic cylindrically-shaped bushing member formed with an internal spherical cavity adapted to accommodate the hinge pin ball head and having an opening at one end in the center of the base thereof remote from the base periphery to provide communication with the internal spherical cavity and means for attaching the resilient bushing to a cooperating linkage member, a thin flexible bellows seal integrally formed with the resilient bushing at the outer periphery of the base thereof and extending axially and then radially inwardly and terminating in an opening adapted to engage the hinge pin shaft, the means for attaching the resilient bushing to a cooperating linkage member comprises the resilient bushing having an exterior annual peripheral recess which has a vertical dimension substantially less than the diameter of the ball head and said spherical cavity, which recess is located with its horizontal center line coincident with center of said spherical cavity and with the horizontal center line of the hinge pin ball head when the ball head is in the bushing cavity and an annular socket attached to the cooperating linkage which annular socket has the same vertical dimension as the annular external recess in the resilient bushing and which annular socket has an inside diameter having the same dimension as the diameter of the annular external recess in the resilient bushing and which fits in the annular external recess to attach the joint to the cooperating linkage whereby the elevation of the lowest point on the annular socket is substantially above the elevation of the opening in the resilient bushing, the axial extent of the bushing taken from the center of said spherical cavity to the end of the bushing remote from the seal being equal to the axial extent of the bushing and seal together taken from the center of the spherical cavity to a plane defining the terminal end of the seal about the stud so as to provide an integral seal structure relatively limited in axial extent.

2. A ball and socket joint as described in claim 1 wherein the annular socket attached to the cooperating linkage is a split ring.

References Cited

UNITED STATES PATENTS

| | | | |
|---|---|---|---|
| 1,828,358 | 10/1931 | Chryst | 287—90 |
| 2,293,582 | 8/1942 | Whittingslowe | 287—90 |
| 2,424,914 | 7/1947 | Brown | 287—85 |

FOREIGN PATENTS

| | | |
|---|---|---|
| 1,090,114 | 9/1960 | Germany. |
| 895,068 | 4/1962 | Great Britain. |
| 1,366,571 | 6/1964 | France. |

EDWARD C. ALLEN, *Primary Examiner.*

CARL W. TOMLIN, *Examiner.*

A. KUNDRAT, *Assistant Examiner.*